United States Patent
Ahn et al.

(10) Patent No.: US 10,270,580 B2
(45) Date of Patent: Apr. 23, 2019

(54) METHOD AND DEVICE FOR TRANSMITTING ACK/NACK IN WIRELESS COMMUNICATION SYSTEM

(71) Applicant: LG ELECTRONICS INC., Seoul (KR)

(72) Inventors: Joonkui Ahn, Seoul (KR); Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/539,419

(22) PCT Filed: Dec. 31, 2015

(86) PCT No.: PCT/KR2015/014546
§ 371 (c)(1),
(2) Date: Jun. 23, 2017

(87) PCT Pub. No.: WO2016/108657
PCT Pub. Date: Jul. 7, 2016

(65) Prior Publication Data
US 2017/0366322 A1   Dec. 21, 2017

Related U.S. Application Data

(60) Provisional application No. 62/098,347, filed on Dec. 31, 2014, provisional application No. 62/120,359, filed on Feb. 24, 2015, provisional application No. 62/161,225, filed on May 13, 2015, provisional application No. 62/161,869, filed on May 14, 2015, provisional application No. 62/190,721, filed on Jul. 9, 2015, provisional application No. 62/203,922, filed on Aug. 12, 2015, provisional application No. 62/209,310, filed on Aug. 24, 2015, provisional application No. 62/216,346, filed on Sep. 9, 2015, provisional application No. 62/251,122, filed on Nov. 5, 2015.

(51) Int. Cl.
*H04L 5/00* (2006.01)
*H04W 72/04* (2009.01)
(Continued)

(52) U.S. Cl.
CPC ............ *H04L 5/0055* (2013.01); *H04L 1/003* (2013.01); *H04L 1/0026* (2013.01);
(Continued)

(58) Field of Classification Search
CPC ......... H04L 5/0042; H04L 1/18; H04W 72/12
See application file for complete search history.

(56) References Cited

U.S. PATENT DOCUMENTS

2011/0268102 A1* 11/2011 Zhu .................... H04L 5/003
370/345
2012/0039279 A1*  2/2012 Chen .................. H04L 1/1861
370/329

(Continued)

FOREIGN PATENT DOCUMENTS

WO    WO 2012/024220 A2    2/2012
WO    WO 2014/142592 A1    9/2014

OTHER PUBLICATIONS

Catt, "PUCCH for TDD eIMTA," 3GPP TSG RAN WG1 Meeting #76, R1-140069, Prague, Czech Republic, Feb. 10-14, 2014, pp. 1-5.

(Continued)

*Primary Examiner* — Kent K Krueger
(74) *Attorney, Agent, or Firm* — Birch, Stewart, Kolasch & Birch, LLP

(57) ABSTRACT

Provided are a method for transmitting an ACK/NACK in a wireless communication system and a device using the same. The device receives a plurality of DL transmission blocks from a plurality of serving cells, and according to ACK/NACK information for the plurality of DL transmission block, selects a physical uplink control channel (PUCCH) format.

12 Claims, 19 Drawing Sheets

(51) Int. Cl.
H04L 1/18 (2006.01)
H04L 1/00 (2006.01)
H04W 72/12 (2009.01)

(52) U.S. Cl.
CPC .......... *H04L 1/1861* (2013.01); *H04L 1/1896* (2013.01); *H04L 5/00* (2013.01); *H04W 72/0446* (2013.01); *H04W 72/0413* (2013.01); *H04W 72/12* (2013.01)

(56) References Cited

U.S. PATENT DOCUMENTS

2014/0036814 A1    2/2014  Zhang et al.
2014/0036844 A1    2/2014  Baldemair et al.
2014/0071864 A1    3/2014  Seo et al.

OTHER PUBLICATIONS

Huawei et al., "PUCCH Transmission Enhancement," 3GPP TSG RAN WG1 Meeting #68bis, R1-121498, Jeju, Korea, Mar. 26-30, 2012, 5 pages.

LG Electronics, "Remaining Details of HARQ Feedback for TDD eIMTA," 3GPP TSG RAN WG1 Meeting #76, R1-140299, Prague, Czech Republic, Feb. 10-14, 2014, pp. 1-4.

MediaTek Inc., "PUCCH Format Switching for HARQ Feedback in Carrier Aggregation," 3GPP TSG RAN WG1 Meeting #62, R1-104543, Madrid, Spain, Aug. 23-27, 2010, 3 pages.

Qualcomm Incorporated, "Number of Bits Conveyed on Multi-bit-ACK PUCCH Format," 3GPP TSG-RAN WG1 #62, R1-104782, Madrid, Spain, Aug. 23-27, 2010, pp. 1-6.

Samsung, "Analysis of PUCCH Format 3 Transmit Diversity Schemes for Rel-11," 3GPP TSG-RAN1 #66bis Meeting, R1-113078, Zhuhai, China, Oct. 10-14, 2011, pp. 1-8.

\* cited by examiner

METHOD AND DEVICE FOR TRANSMITTING ACK/NACK IN WIRELESS COMMUNICATION SYSTEM

CROSS REFERENCE TO RELATED APPLICATIONS

This application is the National Phase of PCT International Application No. PCT/KR2015/014546, filed on Dec. 31, 2015, which claims priority under 35 U.S.C. 119(e) to U.S. Provisional Application No. 62/098,347, filed on Dec. 31, 2014, No. 62/120,359, filed on Feb. 24, 2015, No. 62/161,225, filed on May 13, 2015, No. 62/161,869, filed on May 14, 2015, No. 62/190,721, filed on Jul. 9, 2015, No. 62/203,922, filed on Aug. 12, 2015, No. 62/209,310, filed on Aug. 24, 2015, No. 62/216,346, filed on Sep. 9, 2015, and No. 62/251,122, filed on Nov. 5, 2015, all of which are hereby expressly incorporated by reference into the present application.

BACKGROUND OF THE INVENTION

Field of the Invention

The present invention relates to wireless communication, and more particularly, to a method of transmitting a positive-acknowledgement (ACK)/negative-acknowledgement (NACK) for hybrid automatic repeat request (HARQ) in a wireless communication system, and a device using the method.

Related Art

Third generation partnership project (3GPP) long term evolution-advanced (LTE-A) is a technology which satisfies a bandwidth of at most 100 MHz and a data rate of at most 1 Gbps. Carrier aggregation (CA) is one of techniques for increasing a maximum bandwidth by using a plurality of component carriers. One component carrier operates as one serving cell, and as a result, a terminal receives a service from a plurality of serving cells.

With an increase in the number of supported serving cells, an amount of feedback information reported by the terminal is also increased. The feedback information includes channel state information (CSI), HARQ ACK/NACK, or the like. A physical uplink control channel (PUCCH) is defined for transmission of the feedback information. The existing 3GPP LTE-A provides only three PUCCH formats (i.e., a PUCCH format 1/1a/1b, a PUCCH format 2/2a/2b, a PUCCH format 3) depending on a payload size.

With an increase in the number of serving cells supported in the CA environment, a greater number of PUCCH formats with different payload sizes are required. In addition, how the terminal selects and uses the various PUCCH formats is an issue to be considered.

SUMMARY OF THE INVENTION

The present invention provides a method for transmitting an ACK/NACK in a wireless communication system, and a device using the method.

In an aspect, a method for transmitting an ACK/NACK in a wireless communication system is provided. The method includes receiving, by a wireless device, a plurality of downlink (DL) transport blocks from a plurality of serving cells, selecting, by the wireless device, a physical uplink control channel (PUCCH) format depending on a size of an ACK/NACK for the plurality of DL transport blocks, and transmitting, by the wireless device, the ACK/NACK for the plurality of DL transport blocks by using the selected PUCCH format.

Selecting of the PUCCH format may comprise selecting one of a first PUCCH format and a second PUCCH format.

The first PUCCH format may comprise 24 data symbols, and the second PUCCH format may comprise more than 24 data symbols.

In another aspect, a device for transmitting an ACK/NACK in a wireless communication system includes a transceiver configured to transmit and receive a radio signal, and a processor operatively coupled to the transceiver. The processor is configured to control the transceiver to receive a plurality of downlink (DL) transport blocks from a plurality of serving cells, select a physical uplink control channel (PUCCH) format depending on a size of an ACK/NACK for the plurality of DL transport blocks, and control the transceiver to transmit the ACK/NACK for the plurality of DL transport blocks by using the selected PUCCH format.

A method of transmitting uplink control information is provided when a greater number of serving cells are configured.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE)/LTE-advanced (LTE-A). However, this is for exemplary purposes only, and thus the present invention is also applicable to various wireless communication networks.

The wireless device may be served by a plurality of serving cells. Each serving cell may be defined with a downlink (DL) component carrier (CC) or a pair of a DL CC and an uplink (UL) CC. The plurality of serving cells may be managed by one BS, or may be managed by a plurality of BSs. The plurality of serving cells may be divided into a plurality of cell groups.

The serving cell may be classified into a primary cell (PCell) and a secondary cell (SCell). The PCell operates at a primary frequency, and is a cell designated as the PCell when an initial network entry process is performed or when a network re-entry process starts or in a handover process. The PCell is also called a reference cell. The SCell operates at a secondary frequency. The SCell may be configured after a radio resource control (RRC) connection is established, and may be used to provide an additional radio resource. At least one PCell is configured always. The SCell may be added, modified, or released by using higher-layer signaling (e.g., an RRC message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
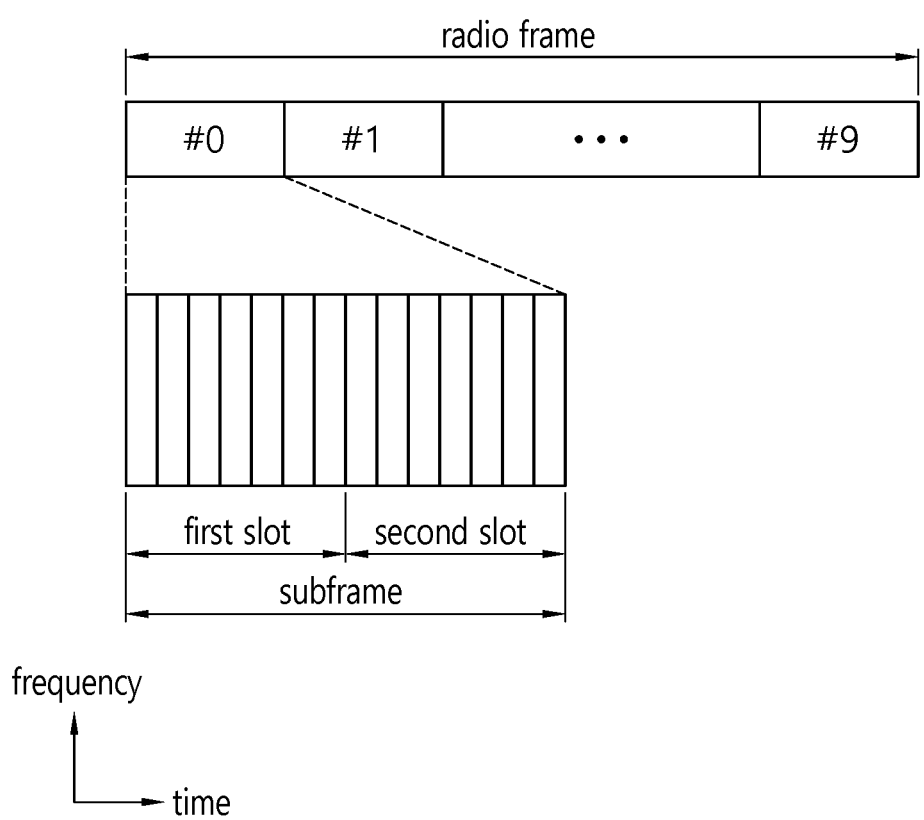
FIG. 1 shows a subframe structure in $3^{rd}$ generation partnership project (3GPP) long term evolution-advanced (LTE-A).

FIG. 1 shows a subframe structure in 3GPP LTE-A.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

A subframe may include a plurality of orthogonal frequency division multiplexing (OFDM) symbols. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 14 OFDM symbols for example, the number of OFDM symbols included in one slot may vary depending on a length of a cyclic prefix (CP). According to 3GPP LTE-A, in case of a normal CP, one slot includes 14 OFDM symbols, and in case of an extended CP, one slot includes 12 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB may include 7×12 resource elements (REs).

A physical channel of 3GPP LTE-A may be classified into a downlink (DL) physical channel and an uplink (UL) physical channel. The DL physical channel includes a physical downlink control channel (PDCCH), a physical control format indicator channel (PCFICH), a physical hybrid-ARQ indicator channel (PHICH), and a physical downlink shared channel (PDSCH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The UL physical channel includes a physical uplink control channel (PUCCH) and a physical uplink shared channel (PUSCH). The PUCCH is allocated in an RB pair in a subframe. RBs belonging to the RB pair occupy different subcarriers in each of a $1^{st}$ slot and a $2^{nd}$ slot. The PUSCH is allocated by a UL grant on the PDCCH. In a normal CP, a $4^{th}$ OFDM symbol of each slot is used in transmission of a demodulation reference signal (DMRS) for the PUSCH.

Uplink control information (UCI) includes at least any one of HARQ ACK/NACK, channel state information (CSI), and a scheduling request (SR). Hereinafter, as an indicator for indicating a state of a downlink (DL) channel, the CSI may include at least any one of a channel quality indicator (CQI) and a precoding matrix indicator (PMI).

In order to transmit a variety of UCI on a PUCCH, a combination between the UCI and the PUCCH is defined as a PUCCH format as shown in the following table.

TABLE 1

| PUCCH format | UCI to be transmitted |
| --- | --- |
| PUCCH format 1 | Positive SR |
| PUCCH format 1a/1b | 1-bit or 2-bit HARQ ACK/NACK |
| PUCCH format 2 | CSI report |
| PUCCH format 2a/2b | CSI report and 1-bit or 2-bit HARQ ACK/NACK |
| PUCCH format 3 | HARQ ACK/NACK, SR, CSI |

The PUCCH format 1a/1b is used to carry the 1-bit or 2-bit HARQ ACK/NACK by using binary phase shift keying (BPSK) modulation or quadrature phase shift keying (QPSK) modulation.

The PUCCH format 3 is used to carry encoded UCI of 48 bits. The PUCCH format 3 may carry HARQ ACK/NACK for a plurality of serving cells and a CSI report for one serving cell.

Figure 2:
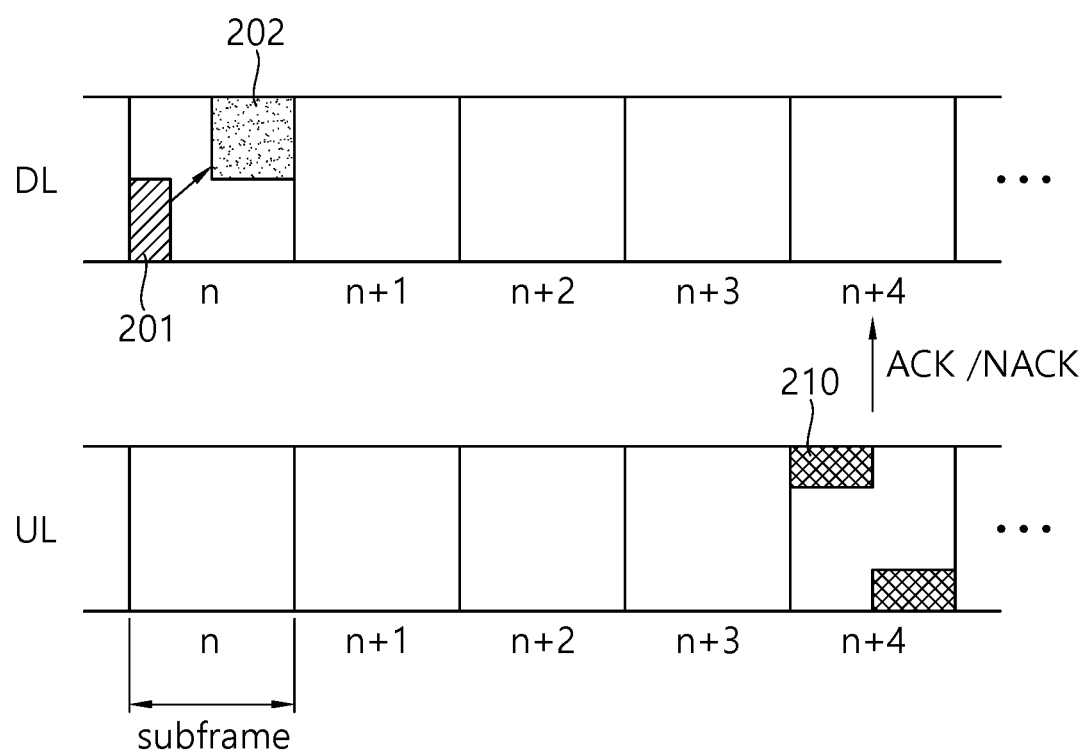
FIG. 2 shows an example of performing hybrid automatic repeat request (HARQ).

FIG. 2 shows an example of performing HARQ.

A wireless device monitors a PDCCH, and receives a DL grant including a DL resource allocation on a PDCCH 201 (or EPDDCH) in a DL subframe n. The wireless device receives a DL transport block through a PDSCH 202 indicated by the DL resource allocation.

The wireless device transmits an ACK/NACK signal for the DL transport block on a PUCCH 210 in a UL subframe n+4. The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In 3GPP LTE-A, 3 types of PUCCH formats (i.e., a PUCCH format 1/1a/1b, a PUCCH format 2/2a/2b, a PUCCH format 3) are used to carry an ACK/NACK signal which is a reception acknowledgement for HARQ. All PUCCH formats use different resource blocks in two slots.

Figure 3:
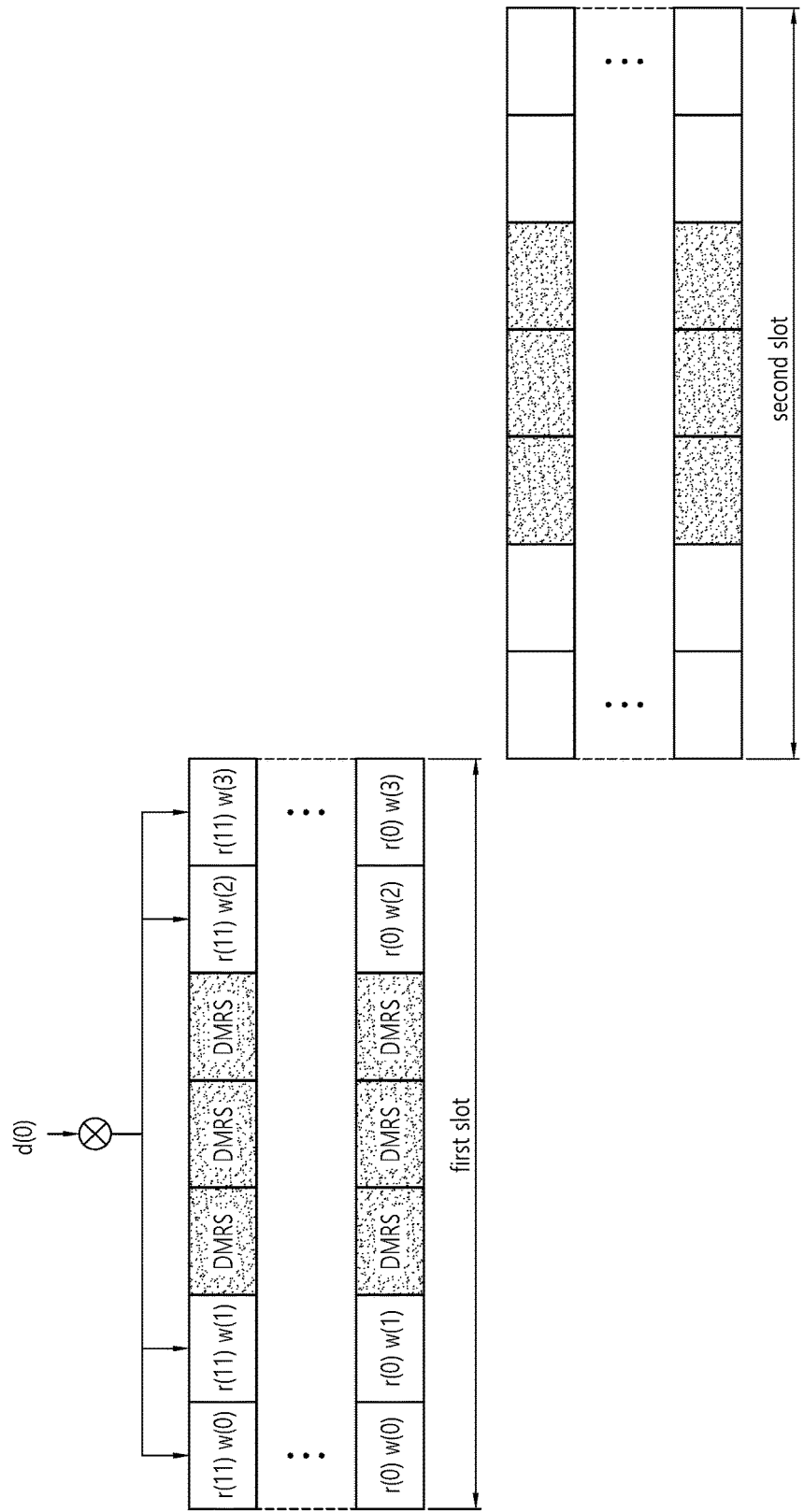
FIG. 3 shows an example of a channel structure for a physical uplink control channel (PUCCH) format 1/1a/1b.

FIG. 3 shows an example of a channel structure for a PUCCH format 1/1a/1b.

One slot includes 7 OFDM symbols. 3 OFDM symbols in the middle are reference signal (RS) OFDM symbols for DMRS. The remaining 4 OFDM symbols are data OFDM symbols for UCI.

A data symbol d(0) is first spread in a frequency domain by using a frequency-domain sequence R(i)={r(0), r(1), r(2), r(3), r(4), r(5), r(6), r(7), r(8), r(9), r(10), r(11)}. The frequency-domain spreading includes that r(i) corresponds to each subcarrier in a resource block. Although not shown, a frequency-domain sequence in each OFDM symbol may be generated by being cyclically shifted by a cyclic shift vale from a basis sequence. The cyclic shift value may be acquired on the basis of a corresponding OFDM symbol index.

The sequence generated by being spread in the frequency domain is spread again in a time domain by using an orthogonal code W(j)={w(0), w(1), w(2), w(3)}. The time-domain spreading includes that w(i) corresponds to each OFDM symbol in a slot.

The data symbol d(0) is used equally in a first slot and a second slot. The PUCCH format 1a uses binary phase shift keying (BPSK) for a data symbol, and carries 1-bit ACK/NACK. The PUCCH format 1b uses quadrature phase shift keying (QPSK) for a data symbol, and carries 2-bit ACK/NACK.

Figure 4:
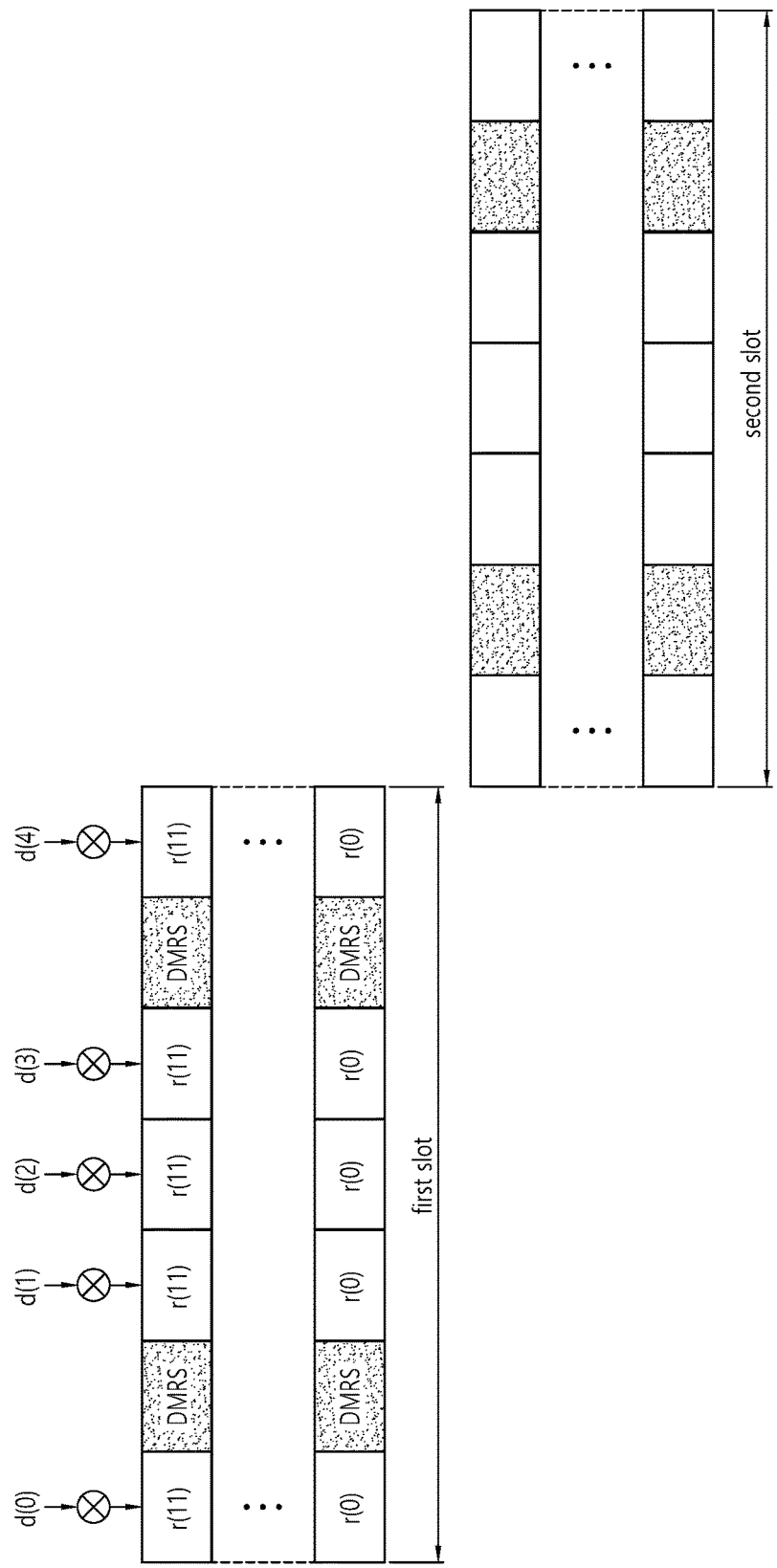
FIG. 4 shows an example of a channel structure for a PUCCH format 2/2a/2b.

FIG. 4 shows an example of a channel structure for a PUCCH format 2/2a/2b.

One slot includes 7 OFDM symbols. $2^{nd}$ and $6^{th}$ OFDM symbols are RS OFDM symbols for DMRS. The remaining 5 OFDM symbols are data OFDM symbols for UCI.

The PUCCH format 2/2a/2b uses only frequency-domain spreading without time-domain spreading. The frequency-domain spreading is achieved by using a frequency-domain sequence R(i)={r(0), r(1), r(2), r(3), r(4), r(5), r(6), r(7), r(8), r(9), r(10), r(11)}. The frequency-domain spreading includes that r(i) corresponds to each subcarrier in a resource block. Although not shown, a frequency-domain sequence in each OFDM symbol may be generated by being cyclically shifted by a cyclic shift vale from a basis sequence. The cyclic shift value may be acquired on the basis of a corresponding OFDM symbol index.

5 data symbols may be transmitted in each slot. Therefore, 10 data symbols d(0) to d(9) may be transmitted in one subframe. When using QPSK, the PUCCH format 2/2a/2b may carry 20 encoded bits. Although not shown, ACK/NACK is transmitted by using a phase offset of 2 RS OFDM symbols. The PUCCH format 2a uses BPSK for a phase offset, and carries 1-bit ACK/NACK. The PUCCH format 2b uses QPSK for a phase offset, and carries 2-bit ACK/NACK.

Figure 5:
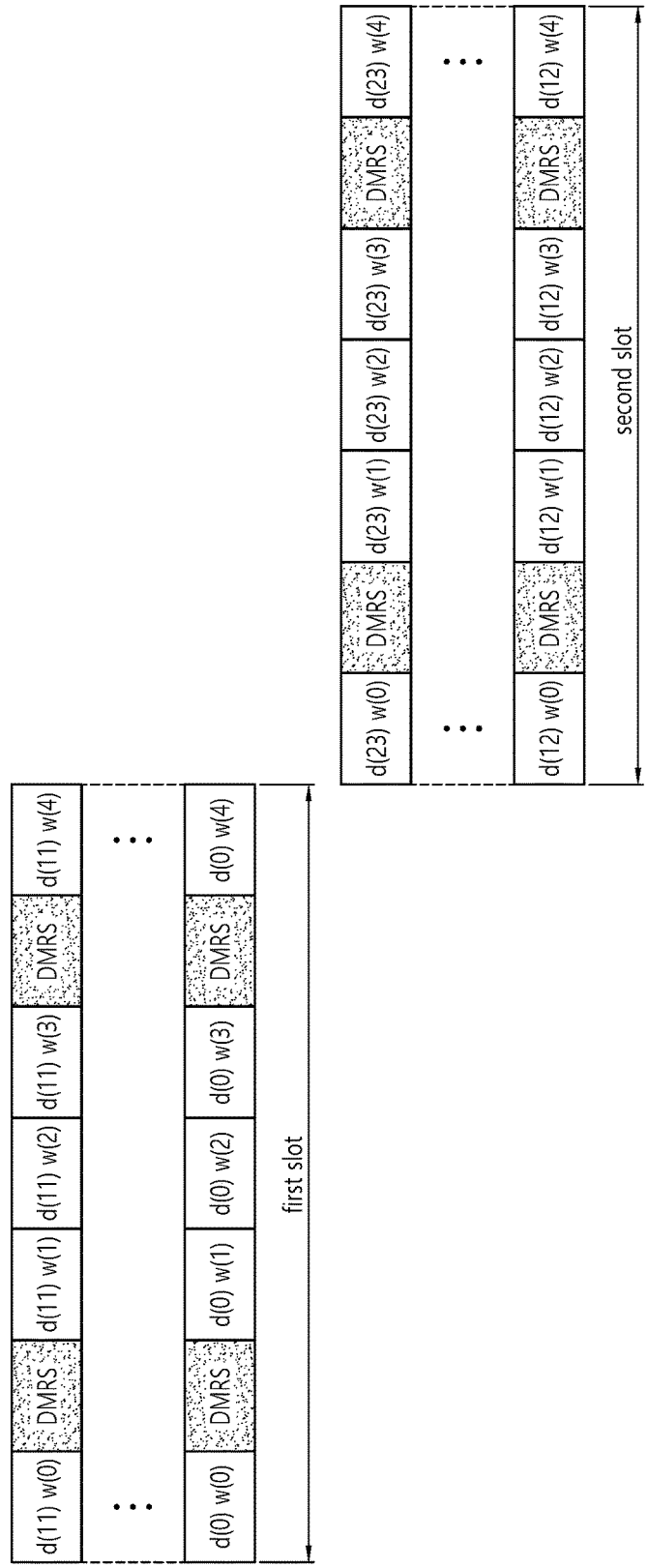
FIG. 5 shows an example of a channel structure for a PUCCH format 3.

FIG. 5 shows an example of a channel structure for a PUCCH format 3.

One slot includes 7 OFDM symbols. $2^{nd}$ and $6^{th}$ OFDM symbols are RS OFDM symbols for DMRS. The remaining 5 OFDM symbols are data OFDM symbols for UCI.

The PUCCH format 3 may carry 24 data symbols d(0) to d(23). When using QPSK, the PUCCH format 3 may carry 48 encoded bits.

In a first slot, first 12 data symbols d(0) to d(11) are spread in a time domain by using an orthogonal code W(j)={w(0), w(1), w(2), w(3), w(4)}. The time-domain spreading includes that w(i) corresponds to each OFDM symbol in a slot. In a second slot, second 12 data symbols d(12) to d(23) are spread in the time domain by using the orthogonal code W(j).

A time/frequency/code resource used in PUCCH transmission is called a PUCCH resource. For example, an orthogonal code index, a cyclic shift index, and a resource block index are required for the PUCCH format 1/1a/1b. A cyclic shift index and a resource block index are required for the PUCCH format 2/2a/2b. An orthogonal code index and a resource block index are required for the PUCCH format 2/2a/2b. A resource index is a parameter used to determine a corresponding PUCCH resource.

A resource index for the PUCCH format 1a/1b for ACK/NACK is given by a corresponding DL grant. Although a resource index for the PUCCH format 3 for ACK/NACK is given by a corresponding DL grant, this is designated in a pre-designated resource index set. For example, a BS pre-designates 4 resource indices for the PUCCH format 3 through an RRC message. In addition, one of the 4 resource indices may be designated through a resource indicator in a DL grant (this is called an 'ACK/NACK resource indicator (ARI)'). If the ARI is 2 bits, it may be defined as follows.

TABLE 2

| ARI value | PUCCH resource |
| --- | --- |
| 00 | first PUCCH resource index |
| 01 | second PUCCH resource index |
| 10 | third PUCCH resource index |
| 11 | fourth PUCCH resource index |

A size of UCI payload that can be carried using the PUCCH format 3 is at most 21 bits. The UCI payload includes the number of information bits before being encoded. However, with an increase in the number of serving cells configured for the wireless device, a required UCI payload size may be more increased.

First, a channel structure of a PUCCH format for the increased UCI payload is described.

For convenience, the PUCCH format for UCI transmission is defined as follows.

1) PUCCHx: A PUCCH format for 1-bit or 2-bit UCI transmission (e.g., a PUCCH format 1/1a/1b)

2) PUCCHy: A PUCCH format for UCI transmission of at most M bits (M>2) (e.g., a PUCCH format 3)

3) PUCCHz: A PUCCH format for UCI transmission exceeding M bits. This is also referred to as an extended PUCCH format.

Figure 6:
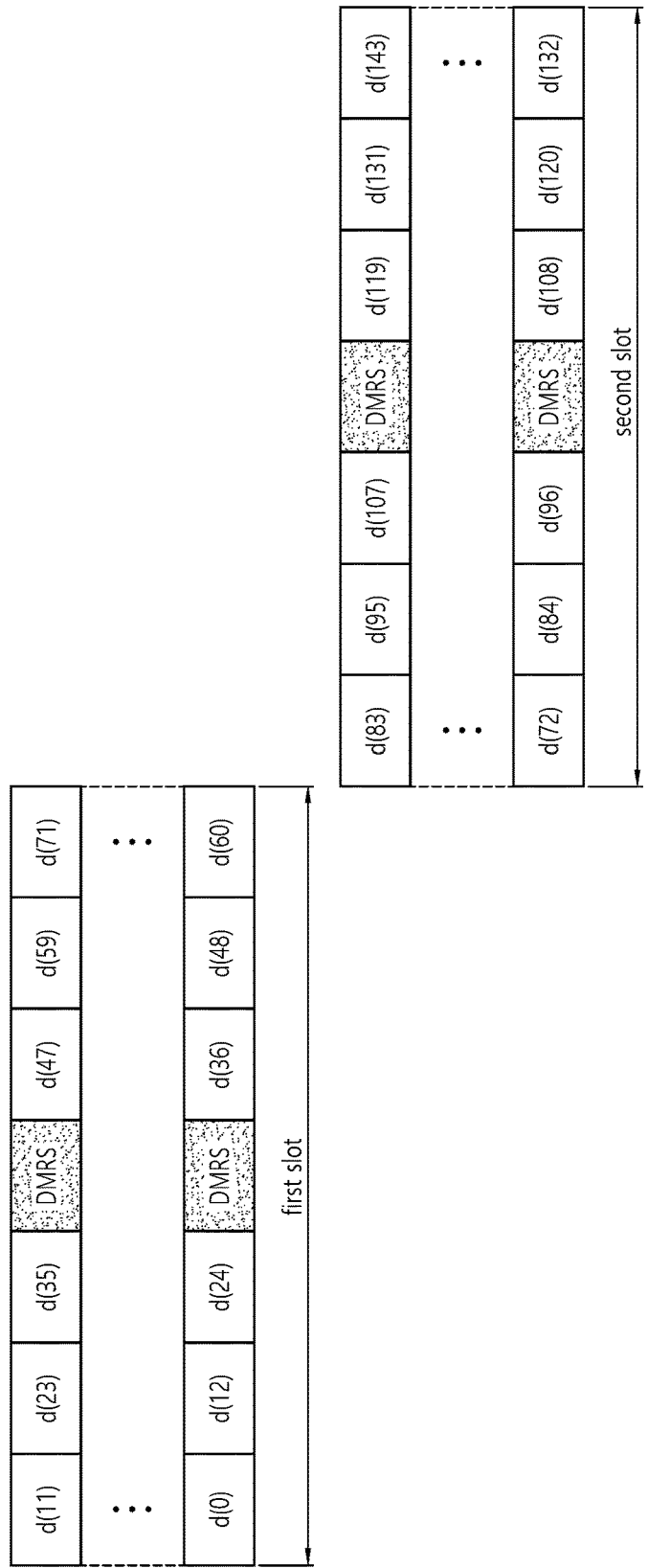
FIG. 6 shows an example of a channel structure for an extended PUCCH format.

FIG. 6 shows an example of a channel structure for an extended PUCCH format.

One slot includes 7 OFDM symbols. An OFDM symbol in the middle (i.e., a $4^{th}$ OFDM symbol) is an RS OFDM symbol for DMRS. The remaining 6 OFDM symbols are data OFDM symbols for UCI. If one slot includes 6 OFDM symbols, a $3^{rd}$ OFDM symbol is an RS OFDM symbol, and the remaining 5 OFDM symbols are data OFDM symbols.

The extended PUCCH format does not use frequency-domain spreading and time-domain spreading. When one resource is allocated to the extended PUCCH format, 12 data symbols may be transmitted for each OFDM symbol. Therefore, 144 data symbols d(0) to d(143) may be transmitted in one subframe. When using QPSK, the extended PUCCH format may carry 288 encoded bits.

Figure 7:
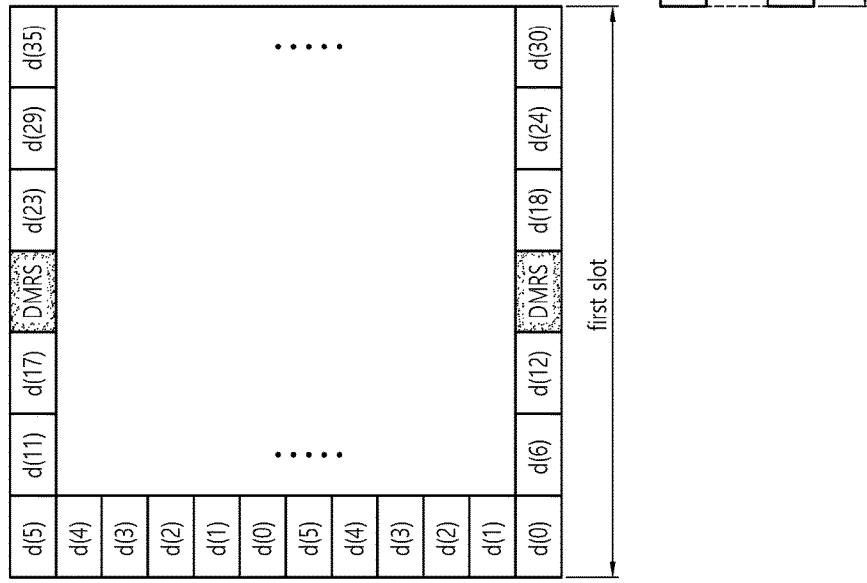
FIG. 7 shows another example of a channel structure for an extended PUCCH format.

FIG. 7 shows another example of a channel structure for an extended PUCCH format.

In comparison with the channel structure of FIG. 6, 6 data symbols are repeated in one resource block for each OFDM symbol. For example, {d(0), d(1), d(2), d(3), d(4), d(5), d(0), d(1), d(2), d(3), d(4), d(5)} is transmitted in a first OFDM symbol. Accordingly, although 144 data symbols can be transmitted in the channel structure of FIG. 6, 72 data symbols d(0) to d(71) may be transmitted in this channel structure. When using QPSK, the extended PUCCH format may carry 144 encoded bits.

In order to support multi-user multiplexing, code division multiplexing (CDM) may be supported in a data symbol repeated in each OFDM symbol. For example, {+d(0), +d(1), +d(2), +d(3), +d(4), +d(5), +d(0), +d(1), +d(2), +d(3), +d(4), d(5)} may be transmitted through CDM 0, and {+d(0), +d(1), +d(2), +d(3), +d(4), +d(5), −d(0), −d(1), −d(2), −d(3), −d(4), −d(5)} may be transmitted through CDM 1. A cyclic shift value used in DMRS may vary depending on the CDM.

For convenience, the channel structure of FIG. 6 is denoted by PUCCHz1, the channel structure of FIG. 7 is denoted by PUCCHz2, and these channels are collectively denoted by PUCCHz.

A plurality of resource blocks may be allocated to the PUCCHz. That is, only one resource block may be allocated to the existing PUCCHx/y, whereas one or more resource blocks may be allocated to the PUCCHz. This means that a bandwidth at which the PUCCHz is transmitted is the same as or greater than a bandwidth at which the PUCCHx/y is transmitted.

A BS may inform each wireless device of an indication regarding whether to use the PUCCHz1 or the PUCCHz2. Each wireless device may confirm whether to use a corresponding PUCCH format through a resource configuration of the PUCCHz1 or a resource configuration of the PUCCHz2. The BS may instruct to use both the PUCCHz1 and the PUCCHz2. The wireless device may select one of the PUCCHz1 and the PUCCHz2 according to a criterion for selecting a PUCCH format described below.

Similarly to the configuration of the PUCCH format 3, in the resource configuration for the PUCCHz, a plurality of candidate resources may be configured in advance through an RRC message, and one of the plurality of candidate resources may be designated through a DL grant.

Now, a criterion for selecting a PUCCH format used in UCI transmission from a plurality of PUCCH formats is described. Although it is described hereinafter that one of the PUCCHy and the PUCCHz is selected for example, it is also possible to select one of the PUCCHx and the PUCCHz or to select one of the PUCCHx, the PUCCHy, and the PUCCHz.

A plurality of selectable PUCCH formats may include a plurality of PUCCH formats having different resource blocks. Alternatively, the plurality of selectable PUCCH formats may include a plurality of PUCCH formats having different bandwidths. For example, one of a first PUCCHz having one resource block and a second PUCCHz having two resource blocks may be selected.

PUCCH Format Selection Based on Size of ACK/NACK Information

Figure 8:
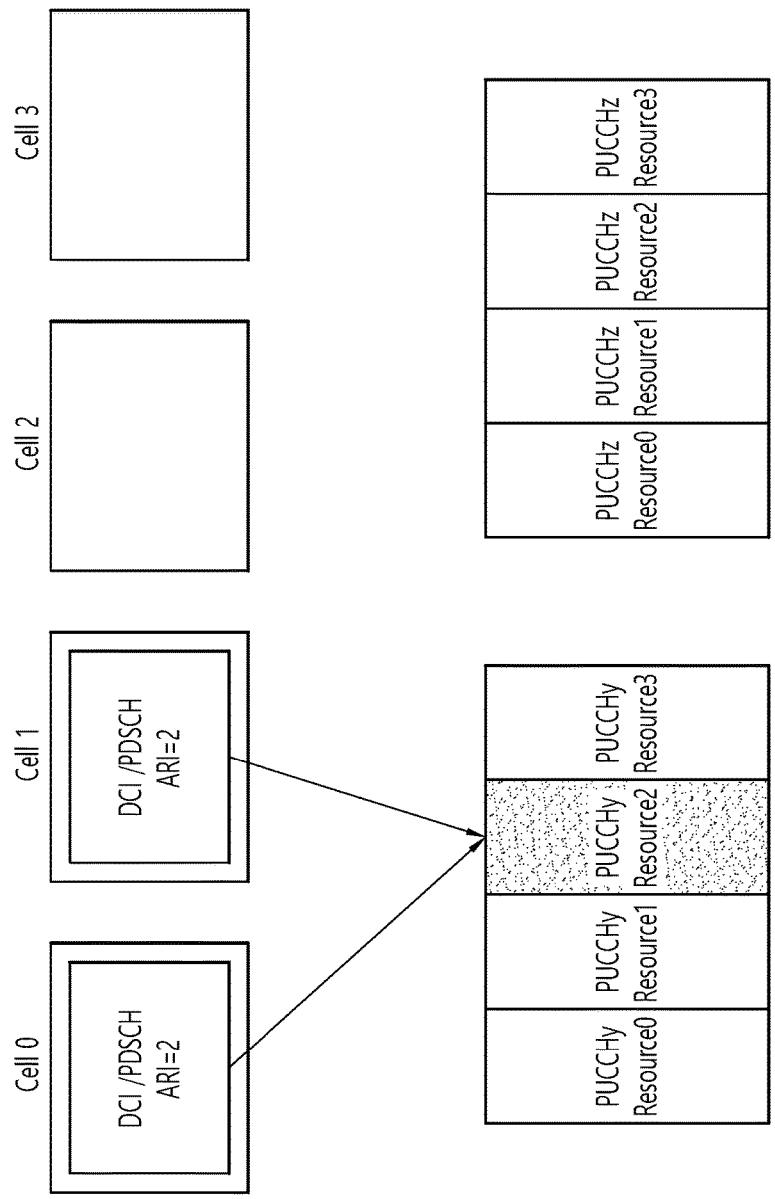
FIG. 8 shows an example of selecting a PUCCH format according to an embodiment of the present invention.

FIG. 8 shows an example of selecting a PUCCH format according to an embodiment of the present invention.

A wireless device may select a PUCCH format depending on a size of ACK/NACK information corresponding to a received PDSCH. The wireless device may select the PUCCH format depending on the size of ACK/NACK information to be fed back for the received PDSCHs or the number of cells in which the PDSCH is received. For example, if the size of ACK/NACK information is less than or equal to M, a PUCCHy may be selected, and if it is greater than M, a PUCCHz may be selected. M may be the maximum number of bits of ACK/NACK information capable of containing the PUCCHy.

Each of a plurality of available candidate PUCCHy resources and candidate PUCCHz resources may be configured, and an ARI in a DCI may indicate one of a plurality of PUCCH resources for the selected PUCCH format.

Herein, a plurality of PDSCHs are received in a cell 0 and a cell 1, and a PUCCHy is selected since a size of ACK/NACK information thereof is less than M. An ARI indicates one of a plurality of candidate PUCCHy resources.

Figure 9:
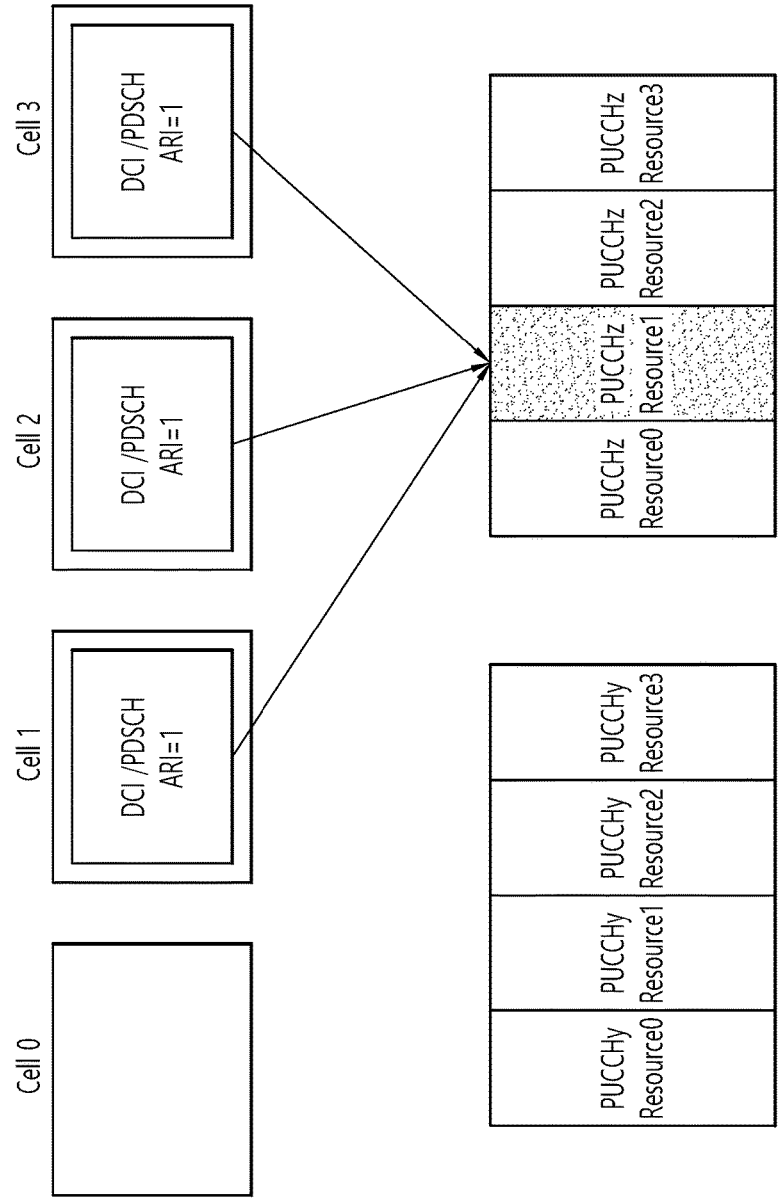
FIG. 9 shows another example of selecting a PUCCH format according to an embodiment of the present invention.

FIG. 9 shows another example of selecting a PUCCH format according to an embodiment of the present invention. A plurality of PDSCHs are received in a cell 1, a cell 2, and a cell 3, and a PUCCHz is selected since a size of ACK/NACK information thereof is greater than M. An ARI indicates a plurality of candidate PUCCHz resources.

Figure 10:
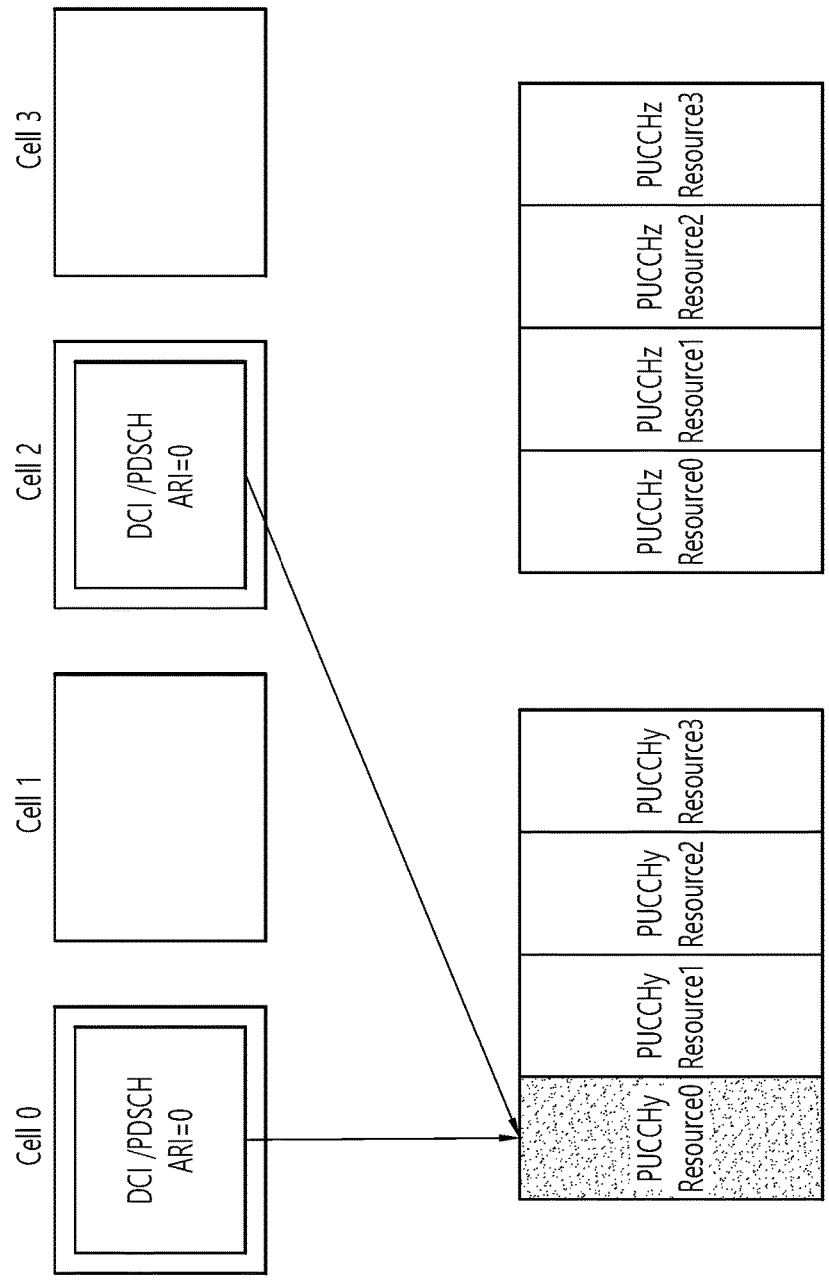
FIG. 10 shows another example of selecting a PUCCH format according to an embodiment of the present invention.

FIG. 10 shows another example of selecting a PUCCH format according to an embodiment of the present invention. A plurality of PDSCHs are received in a cell 0 and a cell 2, and a PUCCHy is selected since a size of ACK/NACK information thereof is less than M. An ARI indicates one of a plurality of candidate PUCCHy resources.

A PUCCH format may be selected depending on a size of ACK/NACK information corresponding to an activated cell.

Figure 11:
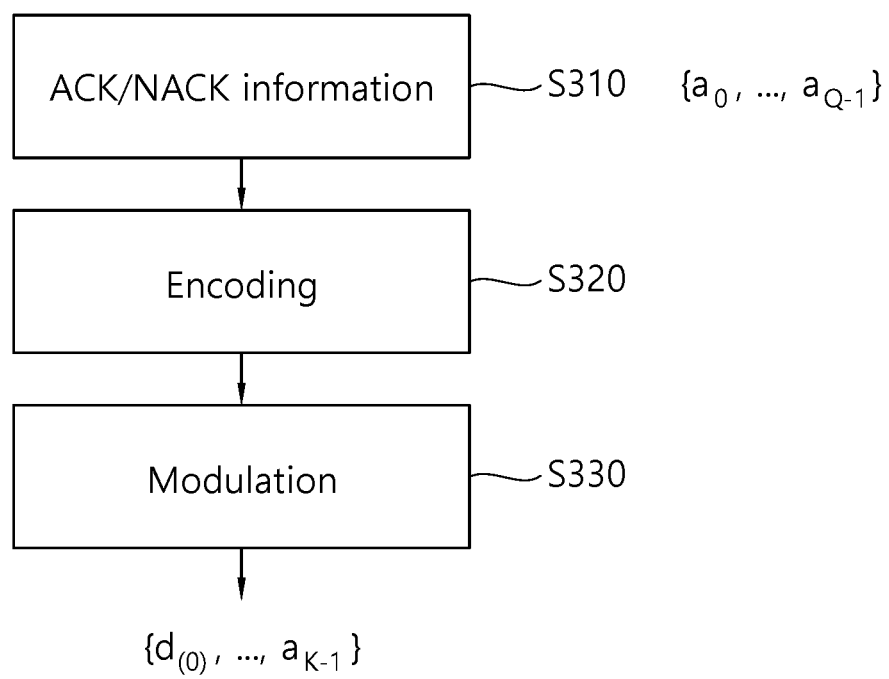
FIG. 11 shows processing of positive-acknowledgement (ACK)/negative-acknowledgement (NACK) information according to an embodiment of the present invention.

FIG. 11 shows processing of ACK/NACK information according to an embodiment of the present invention. This may be processing of ACK/NACK information applied to a PUCCHz.

In step S310, it is assumed that the ACK/NACK information is a Q-bit sequence $\{a_0, \ldots, a_{Q-1}\}$. $a_q$ is an ACK/NACK bit. Q cannot exceed a maximum payload of the PUCCHz.

In step S320, an ACK/NACK information sequence is encoded according to a code rate. A well-known tail-biting convolutional code (TBCC) or the like may be applied as an encoding scheme.

In step S330, an encoded bit is modulated according to a modulation scheme to generate a plurality of data symbols $\{d_0, \ldots, d_K\}$.

To generate ACK/NACK information for a plurality of cells, the following terms are defined for convenience of explanation.

Mi: The number of DL subframes linked to transmit ACK/NACK through a corresponding UL subframe for a cell i.

Nc: The number of PDSCHs capable of transmitting an ACK/NACK feedback for a PUCCH format. Spatial bundling may or may not be applied. When a plurality of transport blocks are transmitted on one PDSCH, if one ACK/NACK bit corresponds to each transport block, it is said that the space bundling is not applied. When a plurality of transport blocks are transmitted on one PDSCH, if one ACK/NACK bit corresponds to the plurality of transport blocks, it is said that the space bundling is applied.

<If it is configured only with an FDD cell, or if a cell for transmitting a PUCCH is the FDD cell, or if Mi=1>

ACK/NACK bits may be arranged in order of a 'c-DAI'. The 'c-DAI' is described below.

Mcell is defined for each PUCCH format. When a maximum c-DAI value received by a wireless device is c-DAImax, the wireless device may select a PUCCH format corresponding to a smallest Mcell where Mcell>=c-DA_max.

The wireless device may transmit ACK/NACK information of Mcell bits corresponding to a PDSCH where c-DAI<=Mcell through the selected PUCCH format. Mcell=Nc may be satisfied for each PUCCH format.

<If a cell satisfying Mi>1 is present>

(1) Cell unit transmission: The wireless device may select a PUCCH format on the basis of a PDSCH-scheduled cell or c-DAI.

ACK/NACK bits may be arranged in order of a c-DAI. When a maximum c-DAI value received by the wireless device is c-DAImax, the wireless device may select a PUCCH format corresponding to a smallest Mcell where Mcell>=c-DA_max. When a maximum value among Mi values of all cells is Mmax, Mcell of each PUCCH format may be designated as a greatest Mcell value where Mcell*Mmax<=Nc. Alternatively, the Mcell of each PUCCH format may be designated as a greatest Mcell value where (Mcell−1)*Mmax<=Nc.

The wireless device preferentially selects cells which have received smallest c-DAI values by using the selected PUCCH format and transmits ACK/NACK information of a maximum total sum of Nc bits corresponding to Mi subframes of each cell. A priority based on the c-DAI cannot be known as to cells which have missed c-DAI reception. To avoid a mismatch regarding ACK/NACK information arrangement, a maximum value among Mi values of all cells may be assumed as an Mi value of each of cells.

Figure 12:
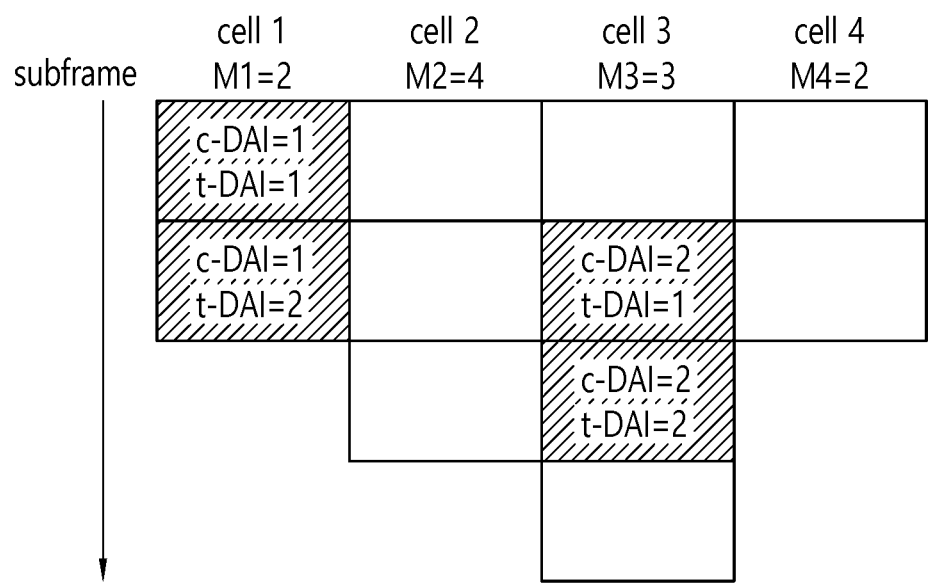
FIG. 12 shows an example of selecting a PUCCH format.

FIG. 12 shows an example of selecting a PUCCH format. A hatched box represents a subframe in which a PDSCH is scheduled. A maximum c-DAI value received by a wireless device is 2, and a maximum Mi value is 4. Therefore, a PUCCH format supporting a smallest Nc greater than or equal to 2*4=8 is selected.

If a size of ACK/NACK information exceeds a capacity of the PUCCH format, ACK/NACK information of a cell corresponding to a last order may be transmitted only in some of Mi subframes.

(2) Cell-subframe combination unit transmission: The wireless device may select a PUCCH format based on a combination of <PDSCH-scheduled cell or c-DAI> and <PDSCH-scheduled subframe or t-DAI>.

ACK/NACK bits may be arranged in order of a c-DAI. Mcell and Msf may be defined for each PUCCH format. Assume that a maximum c-DAI value received by the wireless device is c-DAImax, and a maximum value among t-DAI values received for each cell is t-DAImax. Mcell>=c-DAImax and Msf>=t-DAImax may be satisfied, and a PUCCH format corresponding to a smallest Nc value may be selected. Mcell and Msf may be defined in the range of Mcell*Msf<=Nc.

The wireless device may preferentially select a subframe scheduled with a small t-DAI as a subframe for transmitting ACK/NACK.

Figure 13:
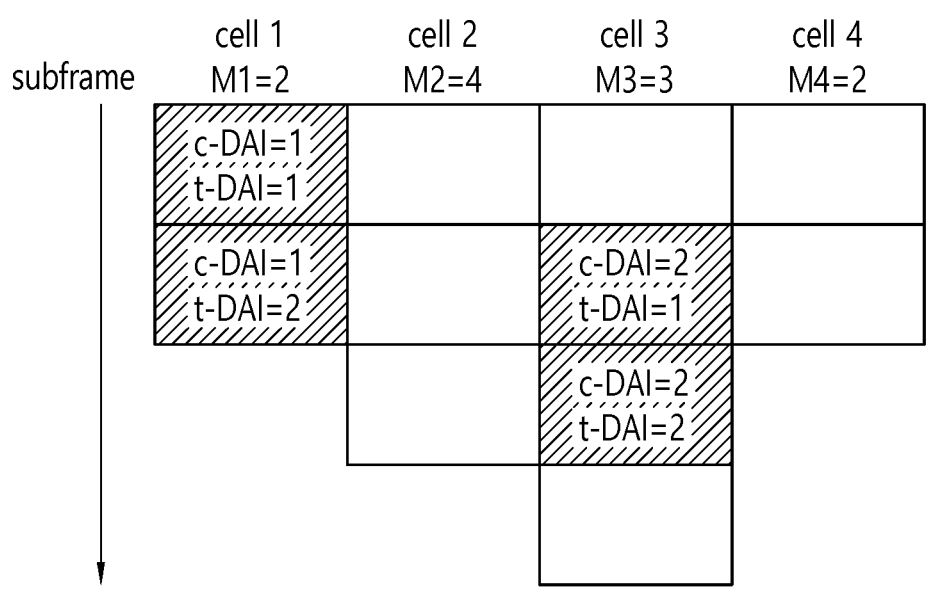
FIG. 13 shows an example of selecting a PUCCH format.

FIG. 13 shows an example of selecting a PUCCH format. A maximum c-DAI value received by the wireless device is 2, and a maximum t-DAI value is 2. Therefore, a PUCCH format corresponding to a smallest Nc value may be selected while supporting Mcell>=2 and Msf>=2.

In the aforementioned embodiment, the PUCCH format may be selected according to an activated cell. The ACK/NACK information may include only an ACK/NACK bit for the activated cell. An ARI may be used only to determine validity of DCI having the ARI.

In the aforementioned embodiment, Nc, Mmax, and Cidmax may be calculated or excluded from a criterion for selecting the PUCCH format under the assumption that a first subframe of a specific cell is always transmitted exceptionally in a UCI payload configuration for the PUCCH. An ACK/NACK bit corresponding to the first subframe of the specific cell may be always arranged at a fixed position in the ACK/NACK information.

The ARI may indicate a PUCCH format and/or a PUCCH resource to transmit the ACK/NACK information. The ARI may indicate the number of bits of ACK/NACK information and/or whether to perform bundling on ACK/NACK. A different ARI may indicate a combination of the same PUCCHz resources and the number of bits of different ACK/NACK information, or may indicate a combination of different PUCCHz resources and the number of bits of different ACK/NACK information.

Figure 14:
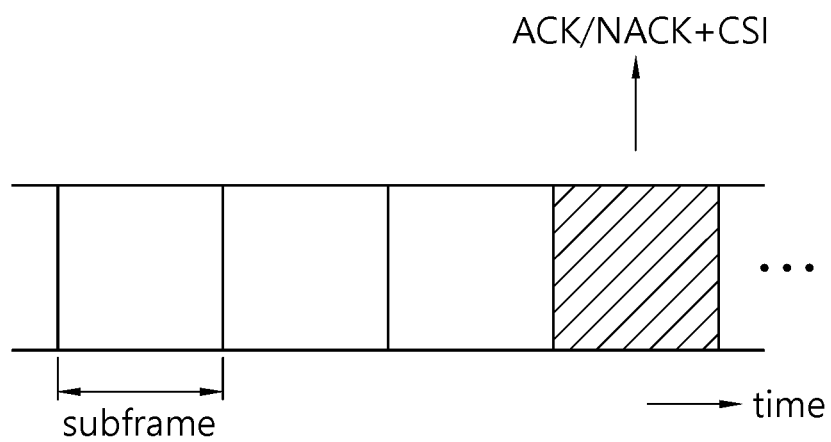
FIG. 14 shows uplink control information (UCI) transmission according to an embodiment of the present invention.

FIG. 14 shows UCI transmission according to an embodiment of the present invention.

CSI transmission may be triggered in a subframe in which ACK/NACK information is to be transmitted. The CSI transmission may be triggered through a periodic CSI report or a DCI-based indication.

If the PUCCH format transmits both the ACK/NACK information and the CSI, the PUCCH format may be determined by considering a CSI payload size.

For example, assume that PUCCHy may be used to transmit L ACK/NACK bits, or ACK/NACK bits corresponding to L cells, and PUCCHz may be used to transmit more than L ACK/NACK bits. Also, assume that a CSI payload size is n bits. Then, in a subframe in which the CSI and the ACK/NACK information are transmitted, the PUCCH format may be selected on the basis of ACK/NACK bits of up to L-n bits and/or ACK/NACKA bits exceeding the L-n bits.

If PUCCHz is selected, CSI transmission may be abandoned and only the ACK/NACK information may be transmitted.

If a sum of the number of ACK/NACK bits for all cells and the number of CSI bits is less than or equal to the maximum number of information bits that can be transmitted on PUCCHz, then both the ACK/NACK and the CSI may be transmitted through the PUCCHz. If the sum exceeds the maximum value, CSI transmission may be abandoned and only the ACK/NACK may be transmitted.

Arrangement of ACK/NACK Information

A method of configuring a bit sequence $\{a_0, \ldots, a_{Q-1}\}$ of ACK/NACK information transmitted through a PUCCH is described. The bit sequence may be an input bit-stream of channel coding for the ACK/NACK information.

(Method 1) A Wireless Device Arranges an ACK/NACK Bit Preferentially (e.g., from a Most Significant Bit (MSB)) for a Cell in which a PDSCH is Received in the ACK/NACK Information.

An order of the ACK/NACK bits may conform to a predetermined rule (e.g., a cell index order). However, the arranging of the ACK/NACK bits through the predetermined rule may result in a mismatch of the ACK/NACK bit arrangement between a wireless device and a BS when the wireless device misses a presence of a scheduled PDSCH in a specific cell. Therefore, a DL assignment index (DAI) may be included in DCI having a DL grant for scheduling the PDSCH.

The DAI may be divided into two types, i.e., a cell-DAI (c-DAI) and a time-DAI (t-DAI). The c-DAI may have a successively increasing value for PDSCHs scheduled for different cells in the same subframe. Alternatively, the c-DAI may have a successively increasing value for PDSCHs scheduled for different cells in different subframes. The t-DAI may have a value which increases for each subframe in which the PDSCH is scheduled for each cell.

The wireless device may arrange ACK/NACK bits in an order of the DAI value in the ACK/NACK information. If DCI having a DAI value smaller than a received maximum DAI value is not received, it is regarded that reception of the DCI corresponding to the missing DAI value has failed, and it may be processed that the ACK/NACK bit is NACK or DTX (a state indicating that PDSCH reception has not be achieved). For example, assume that the received DAI values is {0, 1, 3, 4}. The wireless device may regards that reception of the DCI corresponding to DAI=2 has failed, and thus may process an ACK/NACK bit corresponding to DAI=2 as NACK or DTX.

The ACK/NACK bit corresponding to the received maximum DAI value may be processed as NACK or DTX.

Assume that the PUCCH format is designated by the DCI. If a size of the ACK/NACK information determined based on the maximum DAI value received (or received PDSCH) is greater than a size of a payload of the designated PUCCH format, only information capable of being transmitted through the PUCCH format may be transmitted according to a determined ACK/NACK bit order. For example, if the size of the payload of the designated PUCCH format is 72 bits and the size of the ACK/NACK information obtained from the maximum DAI is 80 bits, only 72 bits out of 80 bits of ACK/NACK information may be transmitted through the PUCCH format.

Since reception of the DCI including the PUCCH format indication may be in an unstable state, the wireless device may not transmit the entire ACK/NACK information. Upon receiving a PDSCH for a PCell, only ACK/NACK information for the PDSCH may be transmitted through the PUCCH. The wireless device may operate under the assumption that it has not received a corresponding PDSCH/PDCCH or all PDSCHs/PDCCHs (a PDSCH/PDCCH for the PCell may be excluded) received in a corresponding subframe. Specifically, PDSCH decoding may not be performed, or PDSCH data may not be stored in a DL HARQ buffer.

It may be adjusted that a cell having a specific feature has a low priority. For example, for an unlicensed cell operating in an unlicensed band which cannot be used exclusively in an LTE system, a DAI value is allowed to have a low priority so that an ACK/NACK bit of the unlicensed cell is arranged to be closed to a least significant bit (LSB).

Figure 15:
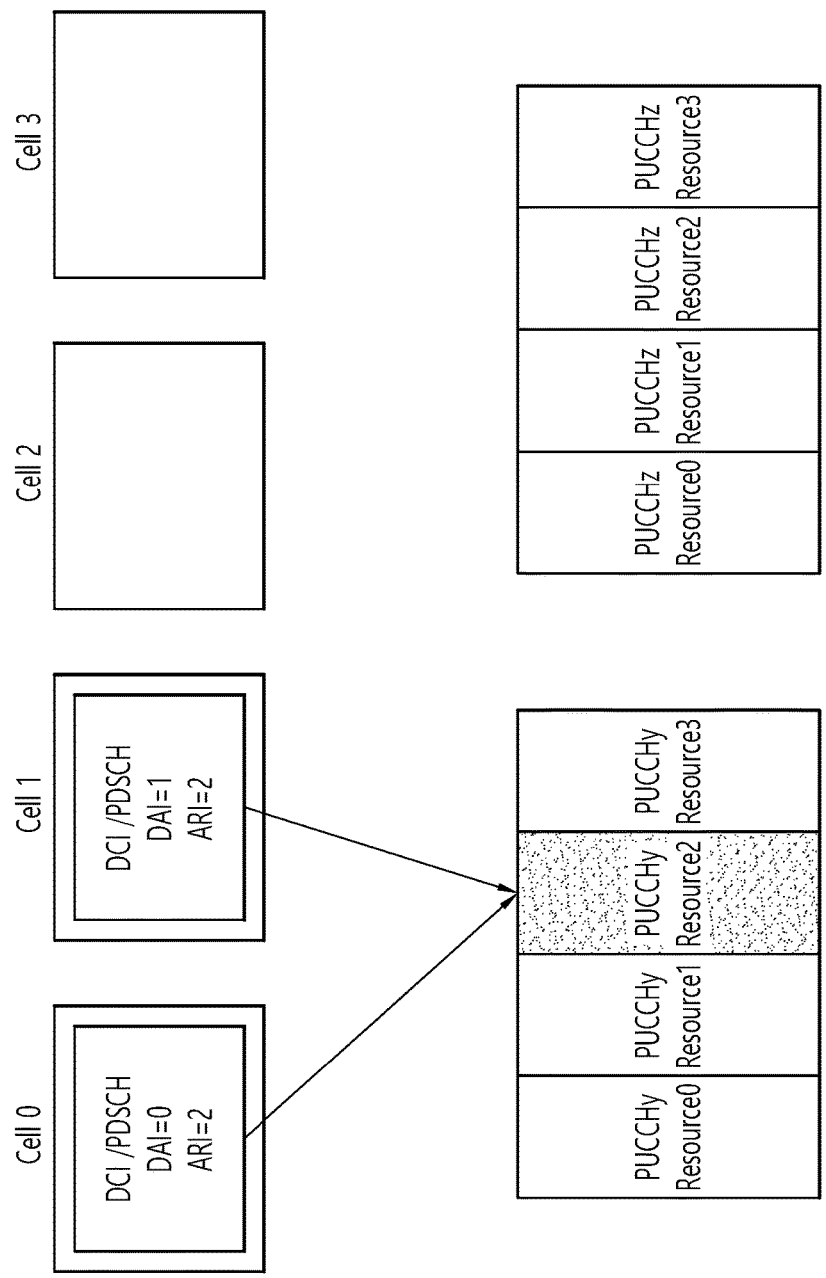
FIG. 15 shows an example of selecting a PUCCH according to an embodiment of the present invention.

FIG. 15 shows an example of selecting a PUCCH according to an embodiment of the present invention.

An ARI may indicate a PUCCH resource for another PUCCH format depending on a range of a DAI. For example, assume that PUCCHy is used if the number of cells in which a PDSCH is received is less than or equal to L, and PUCCHz is used if it exceeds L. An ARI of DCI having a DAI value in the range of 0 to (L−1) may indicate a PUCCHy resource, and an ARI of DCI having a DAI value greater than or equal to L may indicate a PUCCHz resource. The PUCCHy may be used to transmit ACK/NACK information for a PDSCH corresponding to the DAI value in the range of 0 to (L−1), and the PUCCHz may be used to transmit ACK/NACK information for PDSCHs of all cells. Upon receiving the DCI having the DAI value greater than or equal to L, the wireless device may ignore an ARI of DCI having a DAI value less than L.

In the example of FIG. 15, assume that PUCCHy is linked to a DAI value in the range of 0 to 1, and the PUCCHz is linked to a DAI value in the range of 2 to 3. Since a DAI of a cell 0 is 0 and a DAI of a cell 1 is 1, the PUCCHy is selected. An ARI of corresponding DCI designates a PUCCHy resource.

Figure 16:
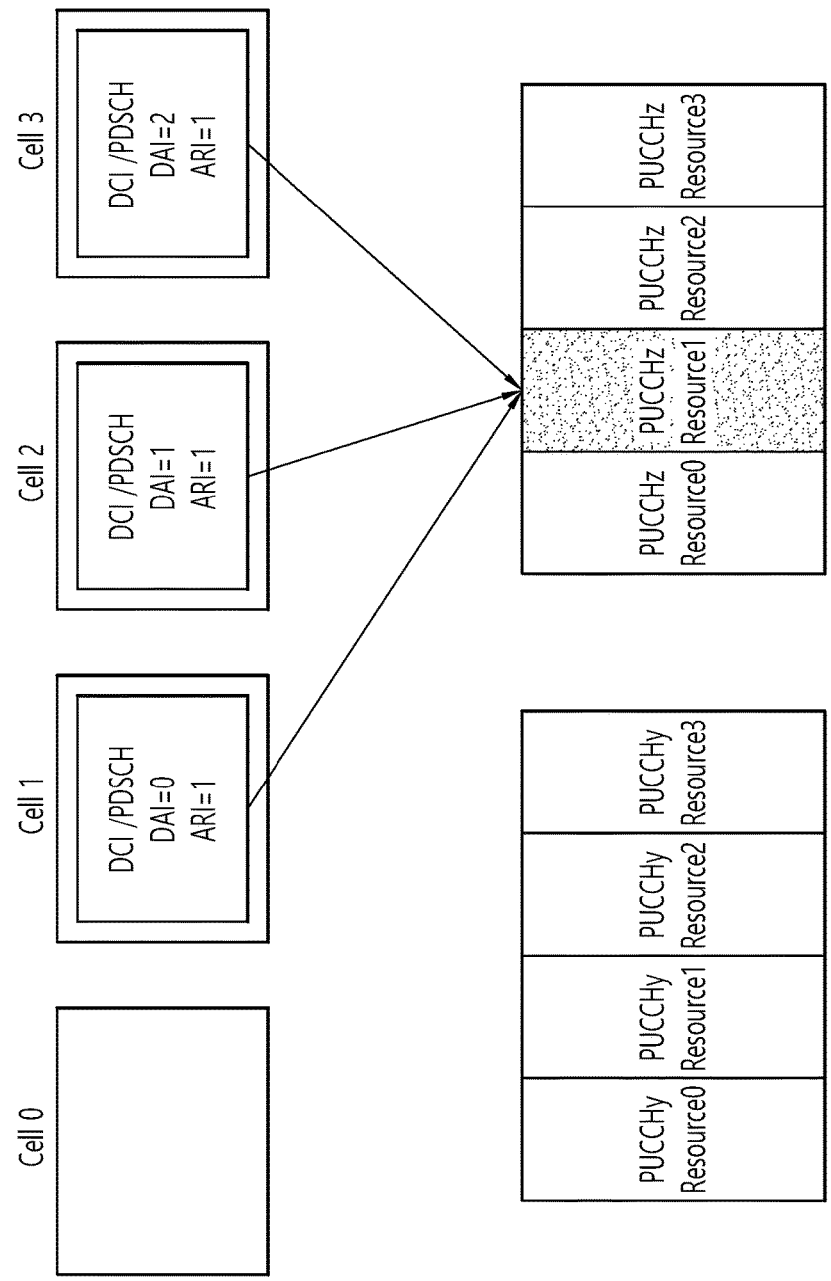
FIG. 16 shows another example of selecting a PUCCH according to an embodiment of the present invention.

FIG. 16 shows another example of selecting a PUCCH according to an embodiment of the present invention. Since there are two or more DAIs, PUCCHz is selected by ignoring the DAIs when the number of DAIs is less than 2.

Figure 17:
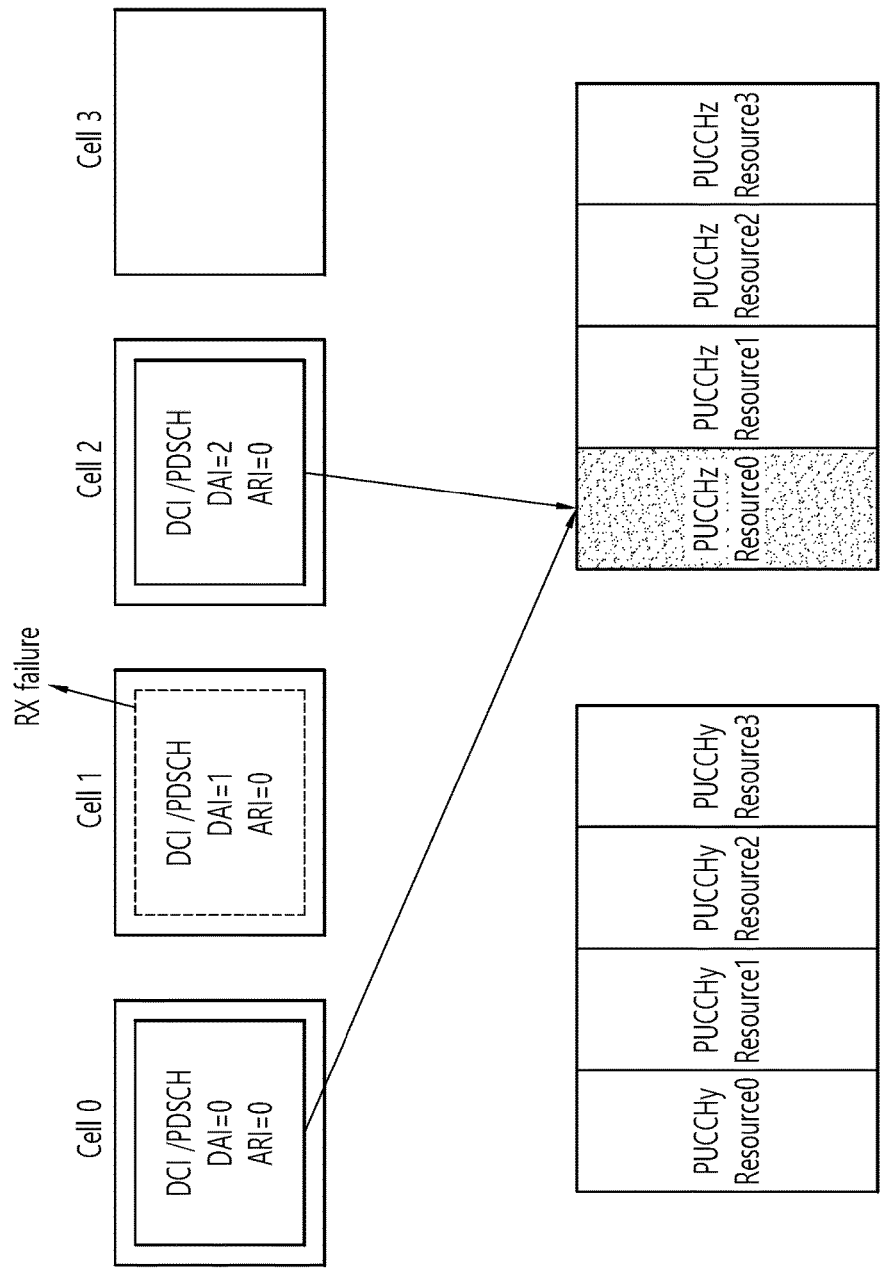
FIG. 17 shows another example of selecting a PUCCH according to an embodiment of the present invention.

FIG. 17 shows another example of selecting a PUCCH according to an embodiment of the present invention. This is a case where reception of DCI of a cell 1 has failed. Since there are two or more DAIs, PUCCHz is selected by ignoring the DAIs when the number of DAIs is less than 2.

In addition, when a plurality of resource blocks are allocated to the PUCCHz, the number of allocated resource blocks may be determined according to the range of the received DAI value.

(Method 2) ACK/NACK Bits for a Plurality of Serving Cells are Arranged at Predetermined Positions.

A wireless device arranges ACK/NACK bits of a configured cell at a position pre-assigned in each PUCCH format. The configured cell may include only an activated cell, or may include an inactivated cell other than the activated cell.

For example, ACK/NACK bits corresponding to cells having a lowest cell index among all configured cells may be arranged in the PUCCHy, and ACK/NACK bits for all configured cells may be arranged in the PUCCHz.

Assume that the PUCCH format is designated by the DCI. Upon receiving a PDSCH of a cell in which the arrangement of the ACK/NACK bit is not designated, the wireless device may not transmit the ACK/NACK bit corresponding to the PDSCH.

Since reception of the DCI including the PUCCH format indication may be in an unstable state, the wireless device may not transmit the entire ACK/NACK information. Upon receiving a PDSCH for a PCell, only ACK/NACK information for the PDSCH may be transmitted through the PUCCH. The wireless device may operate under the assumption that it has not received a corresponding PDSCH/PDCCH or all PDSCHs/PDCCHs (a PDSCH/PDCCH for the PCell may be excluded) received in a corresponding subframe. Specifically, PDSCH decoding may not be performed, or PDSCH data may not be stored in a DL HARQ buffer.

(Method 3) ACK/NACK Compression is Applicable According to the PUCCH Format.

If the PUCCH format is designated through DCI, the wireless device may transmit ACK/NACK information for all cells configured in the designated PUCCH format. Spatial bundling based on a logical-AND operation may be applied to a plurality of ACK/NACK bits for a plurality of transport blocks received from each cell. Bundling based on the logical-AND operation may be applied to a plurality of ACK/NACK bits for a plurality of transport blocks received in a plurality of subframes. When bundling is applied, the number of ACK/NACK bits to be transmitted may be decreased. ACK/NACK to which bundling is applied is called bundled ACK/NACK.

If a payload size differs for each PUCCH format, whether to apply bundling may be determined according to the payload size. For example, if PUCCHy is selected, the bundled ACK/NACK may be transmitted for a part of the entire cell (or entire DAI). If PUCCHz is selected, bundling may not be applied to the entire cell (or entire DAI). If there are not many cells to be actually scheduled in comparison with the total number of cells, a PUCCH format having a small payload size may be utilized to effectively use a PUCCH resource.

If the PUCCH format has a payload size which differs depending on the PUCCH resource, whether to apply bundling may be determined depending on the payload size. For example, if a PUCCHz resource 0 is selected, bundled ACK/NACK may be transmitted for a part of the entire cell (or entire DAI). If a PUCCHz resource 1 is selected, bundling may not be applied to the entire cell (or entire DAI). If there are not many cells to be actually scheduled in comparison with the total number of cells, a code rate of ACK/NACK information may be decreased to improve ACK/NACK transmission performance.

Meanwhile, when the number of ACK/NACK bits to be transmitted in one UL subframe is determined according to the number of DL subframes associated with the UL subframe as in the TDD system, the selection of the PUCCH format according to the aforementioned embodiment may be configured selectively for each subframe. It is considered that a subframe X is configured to transmit ACK/NACK bits corresponding to X or more DL subframes and a subframe Y is configured to transmit Y or more maximum ACK/NACK bits. The subframe X and/or the subframe Y may be a subframe to which PUCCH selection is applied. A PUCCHy resource and a PUCCHz resource may be allocated in the subframe X and/or the subframe Y, and PUCCHy or PUCCHz may be selected according to a size of ACK/NACK information or an indication of DCI. In the other subframes, ACK/NACK may be transmitted through PUCCHx or PUCCHy or PUCCHz without the selection of the PUCCH format.

An ARI of the DCI corresponding to the ACK/NACK transmitted in the subframe to which the PUCCH selection is applied may designate which one will be used among a plurality of candidate PUCCH resources. The number of bits of the ARI of the DCI corresponding to the ACK/NACK transmitted in the subframe to which the PUCCH selection is applied may be equal to or greater than the number of bits of an ARI of DCI corresponding to ACK/NACK transmitted in a subframe to which the PUCCH selection is not applied.

A first ARI of DCI corresponding to a subframe for selecting one of PUCCHy and PUCCHz may designate M+N states. M denotes the number of configured PUCCHy resources, and N denotes the number of configured PUCCHz resources. A second ARI of DCI corresponding to a subframe not supporting PUCCHz has the same number of bits as the first ARI, but may designate only M states.

Determination of ACK/NACK Payload Size

When N DL cells are configured in the existing LTE system and when a PUCCH format 3 is used, ACK/NACK bits corresponding to the N DL cells are all transmitted always. A size of an ACK/NACK payload of the PUCCH format 3 is determined according to the number of configured all DL cells. However, even if the number of configured cells is great, the number of cells in which actual PDSCH data is scheduled may be less than that number.

Therefore, it is proposed a method of determining a size of an ACK/NACK payload of a PUCCH format in every subframe by using a set of sizes of limited ACK/NACK payloads. A PUCCH format to which the present embodiment is applied may be PUCCHz or PUCCHy.

(Method 1) A Size of an ACK/NACK Payload is Determined According to the Number of Scheduled Cells.

A cell in which PDSCH data is scheduled is called a scheduled cell. The size of the ACK/NACK payload may be determined according to the number of scheduled cells.

A size $n_p$ of available ACK/NACK payloads capable of being transmitted through the PUCCH format may be limited to a specific set $\{n_1, n_2, \ldots, n_{P-1}, n_P\}$. Herein, $n_1 < n_2 < \ldots < n_{P-1} < n_P$. When there is a need to transmit m-bit ACK/NACK information, the wireless device may determine a minimum value less than m to an ACK/NACK payload size $n_p$. $n_p$ and m may be set to the number of bits to be subjected to ACK/NACK feedback or the number of cells to be subjected to ACK/NACK feedback. The number of scheduled cells may imply the number of cells corresponding to a maximum DAI value received by the wireless device. However, since the number of scheduled cells may be mismatched between the wireless device and the BS due to a PDCCH reception failure or the like, the BS may attempt decoding on a size of a plurality of ACK/NACK payloads.

If there is a PDSCH having no DAI (e.g., a PDSCH or the like transmitted without a PDCCH), the size of the ACK/NACK payload may be determined in the following manner.

First, a value obtained by adding the number of PDSCHs having no DAI to the number of PDSCHs calculated as the DAI value is set to m, and the size of the ACK/NACK payload is determined.

Second, m is set according to the number of PDSCHs calculated as the DAI value, and the number of PDSCHs having no DAI is added to m to determine the ACK/NACK payload size.

(Method 2) the Size of the ACK/NACK Payload is Determined According to the Scheduled Cell Group.

A cell configured for a wireless device is divided into P groups, and a size of a available ACK/NACK payload that can be transmitted through a PUCCH format is limited to $\{n_1, n_2, \ldots n_{P-1}, n_P\}$. Herein, $n_1 < n_2 \ldots < n_{P-1} < n_P$. $n_j$ implies a size of an ACK/NACK payload corresponding to a cell belonging to groups 1, 2, ..., j, that is, from a $1^{st}$ group to a j-th group.

The wireless device determines an ACK/NACK payload size corresponding to $n_j$ when the cell group is at most the j-th group, and transmits ACK/NACK information for cells corresponding to the $1^{st}$ group to the j-th group. However, since the number of scheduled cells may be mismatched between the wireless device and the BS due to a PDCCH reception failure or the like, the BS may attempt decoding on a size of a plurality of ACK/NACK payloads.

A minimum size $n_1$ in the set of payload sizes is equal to or greater than the minimum number of ACK/NACK bits (or ACK/NACK payload size corresponding to the minimum number of scheduled cells) that can be transmitted by the wireless device through the PUCCH format. The maximum size $n_p$ is greater than or equal to the maximum number of ACK/NACK bits (or an ACK/NACK payload size corresponding to the maximum number of scheduled cells) that can be transmitted through the PUCCH format. $n_p$ may be a size of an ACK/NACK payload corresponding to the total number of cells configured for the wireless device. $n_p$ may be a size of an ACK/NACK payload corresponding to the total number of activated cells configured for the wireless device.

Now, selection of a PUCCH format based on a DAI and ACK/NACK information transmission will be described.

DCI may include a DAI and a total DAI. The total DAI may be a value capable of estimating the total number of DL grants transmitted by a BS (or the total number of PDSCHs transmitted by the BS). A selected PUCCH format may have a smallest maximum payload greater than the number of bits of ACK/NACK information corresponding to the total number of DL grants estimated from the total DAI. An ARI may indicate a resource of a determined PUCCH format.

The total DAI may be expressed by one value corresponding to 'ACK/NACK bits more than (exceeding) X bits' and one or more values corresponding to 'ACK/NACK bits less than (below) X bits'. The X bit is a boundary point at which CRC is attached to a bit-stream of ACK/NACK information, and it is assumed that the CRC is not attached if the number of bits of ACK/NACK information is less than (below) X bits. Since the CRC is attached when the number of ACK/NACK bits to be transmitted is more than (exceeds) X bits, the BS may determine the ACK/NACK size by performing CRC checking on the number of available ACK/NACK bits. The CRC is not attached when ACK/NACK information less than (below) X bits is transmitted. Therefore, the wireless device may transmit ACK/NACK information of which the number of bits is designated by the total DAI.

As described above, the c-DAI has a successively increasing value for the PDSCH scheduled for different cells, and the t-DAI may have a value which increases for each subframe in which a PDSCH is scheduled for each cell. In addition, the cc-DAI is a value counted by being included in DCI of all subframes and all cells to be scheduled.

Figure 18:
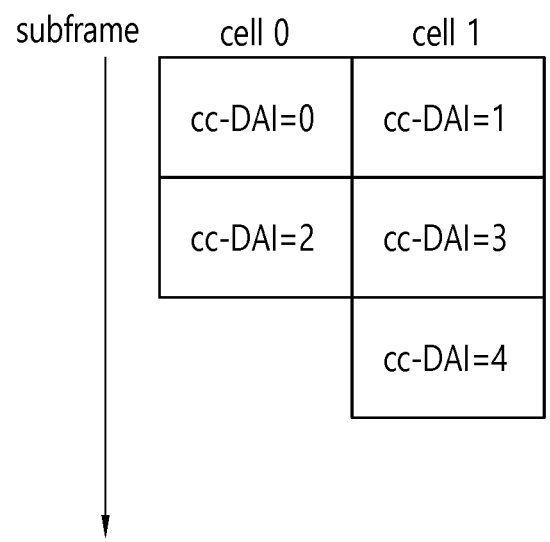
FIG. 18 shows an example of a cc-downlink assignment index (DAI).

FIG. 18 shows an example of a cc-DAI. Assume that there are two cells, i.e., cell 0 and cell 1, and there is DCI having a DL grant for each subframe. In the same subframe, a cell having a low cell index is prioritized, and the cc-DAI is counted. In the present specification, the DAI may include the cc-DAI.

Assume that information regarding a size of an ACK/NACK payload is included in DCI to be scheduled. When ACK/NACK information for a plurality of PDSCHs to be transmitted through M subframes is transmitted through one UL subframe as in the TDD system, a BS may not be able to determine the ACK/NACK payload size until PDSCH scheduling is complete for M subframes. If the determining of scheduling for the M subframes is not complete until a DL grant is configured for a first subframe among the M subframes, the ACK/NACK payload size may differ depending on the DL grant. Therefore, the following method is proposed.

The wireless device may select a PUCCH format or may configure an ACK/NACK payload through DCI in a most recently received subframe among the M subframes.

The wireless device may select a PUCCH format or configure the ACK/NACK payload according to a cell group corresponding to the entire DCI received among the M subframes or an indicated ACK/NACK payload.

The DL grant may include a DAI and a total DAI. The wireless device may select the PUCCH format or configure the ACK/NACK payload according to an indication of a DL grant corresponding to a received last DAI value (or a greatest DAI value). The wireless device may select the PUCCH format or configure the ACK/NACK payload according to an indication of a DL grant corresponding to a received last total DAI value (or a greatest total DAI value).

The wireless device may select the PUCCH format or configure the ACK/NACK payload according to an accumulation value of all received DAIs. The wireless device may select a PUCCH format or configure an ACK/NACK payload according to an accumulation value of all received total DAIs.

The number of ACK/NACK bits transmitted through PUCCHz in the aforementioned methods may be determined according to the number of scheduled cells, a cell ID, a cell group ID, or the like for each subframe. The number of ACK/NACK bits to be transmitted through PUCCHy may be fixed. The wireless device may transmit NACK (or DTX) in a place of an ACK/NACK bit corresponding to cells in which a PDSCH for actually feeding back ACK/NACK is not scheduled. In particular, it may be applied to a case where CRC is not attached to an ACK/NACK bit to be transmitted through PUCCHy, and there is an advantage in that the BS does not have to separately detect a size of ACK/NACK to be transmitted through PUCCHy.

ACK/NACK Information Classification in the Same ACK/NACK Payload Size

Even if a PUCCH format selected by a wireless device and an ACK/NACK payload size of the PUCCH format are determined, if a configuration of ACK/NACK information actually transmitted is different, the wireless device may need to inform a BS of a method of configuring the ACK/NACK information.

For example, assume that there is a cell group A and a cell group B, and that the wireless device selects a PUCCH format to transmit an ACK/NACK according to a cell group for receiving a PDSCH. PUCCHy is selected when PDSCH is received only through the cell group A, and the wireless device transmits the ACK/NACK information through the PUCCHy. In this case, the wireless device may transmit additional information on a PUCCH to inform a certain cell group of which ACK/NACK information is informed by the PUCCHy.

A plurality of transport blocks may be transmitted on one PDSCH through multiple input multiple output (MIMO). Regarding ACK/NACK spatial bundling, the following method may be applied to PUCCH selection. 'Nb' denotes the number of ACK/NACK bits to be transmitted when spatial bundling is not applied in a UL subframe, and 'Nr' denotes the number of ACK/NACK bits to be transmitted when spatial bundling is applied in the UL subframe.

A PUCCH format capable of transmitting at least Nb bits (with a smallest payload size) is selected, and spatial bundling is not applied. When a PUCCH format with a greatest payload size cannot accommodate the Nb bits, the spatial bundling is applied. In addition, the PUCCH format is selected on the basis of Nr bits.

A PUCCH format capable of transmitting at least Nr bits (with a smallest payload size) is selected. If the selected PUCCH format cannot accommodate at least Nb bits, spatial bundling is not applied. Otherwise, the spatial bundling is applied.

The selected PUCCH format may include additional information indicating whether spatial bundling is applied to ACK/NACK information. When the spatial bundling is applied according to the required number of ACK/NACK bits, the selected PUCCH format may include additional information indicating whether the spatial bundling is applied to the ACK/NACK information. The additional information may be transmitted in a form of CRC masking of the ACK/NACK information, a scrambling sequence of the ACK/NACK information, a sequence masked to DMRS of the PUCCH, or the like.

Assume that Nbmax denotes the maximum number of ACK/NACK bits that can be transmitted in the selected PUCCH format. If Nr<=Nbmax<Nb, the spatial bundling may be applied, and if Nb<Nbmax, the spatial bundling may not be applied. The number of bits of the ACK/NACK information varies depending on whether the spatial bundling is applied, and this may cause complexity of ACK/NACK decoding of a BS. In order to avoid this, additional bits of Nb-Nr may be added to the ACK/NACK information when the spatial bundling is applied. That is, the PUCCH format always transmits information of Nb bits regardless of whether the spatial bundling is applied. The Nb-bit ACK/NACK information or the Nr-bit ACK/NACK information may be selected on the basis of a scheduled cell, an activated cell, or a configured cell.

Figure 19:
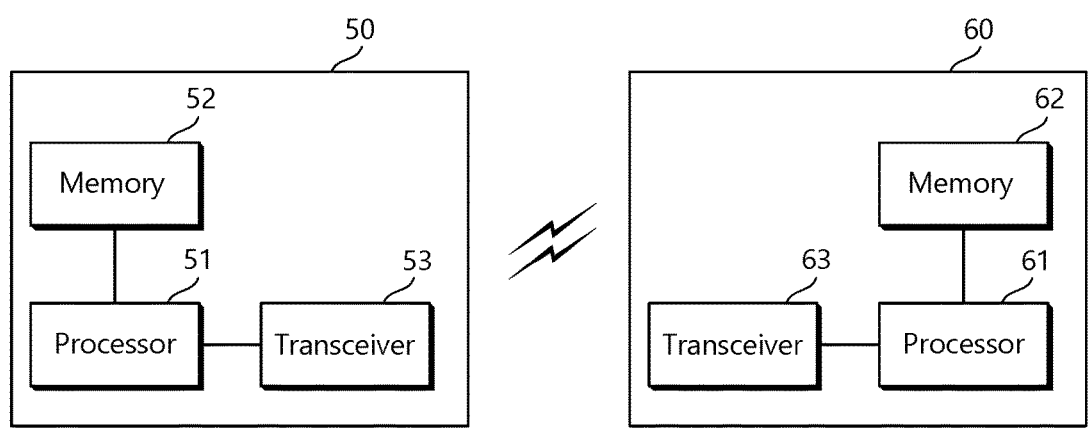
FIG. 19 is a block diagram showing a wireless communication system according to an embodiment of the present invention.

FIG. 19 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, a UL control operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting an acknowledgement/negative acknowledgement (ACK/NACK) in a wireless communication system, the method performed by a wireless device configured with a plurality of serving cells, the method comprising:
   receiving a first resource configuration for a first physical uplink control channel (PUCCH) format;
   receiving a second resource configuration for a second PUCCH format;
   receiving at least one physical downlink shared channel (PDSCH) from at least one serving cell of the plurality of serving cells;
   selecting one of the first PUCCH format and the second PUCCH format based on a size of an ACK/NACK for the at least one PDSCH; and
   transmitting the ACK/NACK by using the selected PUCCH format,
   wherein the first PUCCH format is a PUCCH format 3, and the second PUCCH format has a larger payload size than the first PUCCH format,
   wherein at least one downlink (DL) grant is received for the at least one PDSCH, the at least one DL grant including an ACK/NACK resource indicator (ARI), and
   wherein:
   if the first PUCCH format is selected, the ARI indicates a PUCCH resource used for the first PUCCH format in the first resource configuration, and
   if the second PUCCH format is selected, the ARI indicates a PUCCH resource used for the second PUCCH format in the second resource configuration.

2. The method of claim 1, wherein the first PUCCH format comprises 24 data symbols, and the second PUCCH format comprises more than 24 data symbols.

3. The method of claim 2, wherein the first PUCCH format comprises 4 orthogonal frequency division multiplexing (OFDM) symbols for a demodulation reference signal (DMRS) in a subframe, and the second PUCCH format comprises 2 OFDM symbols for the DMRS in the subframe.

4. The method of claim 1, wherein only one resource block is allocated to the first PUCCH format, and the second resource configuration includes information on a number of resource blocks allocated to the second PUCCH format.

5. The method of claim 1, wherein the second PUCCH format is transmitted in a wider bandwidth than the first PUCCH format.

6. The method of claim 1, wherein the plurality of serving cells include a secondary cell, the ACK/NACK being transmitted by using the selected PUCCH format at the secondary cell.

7. A device for transmitting an acknowledgement/negative acknowledgement (ACK/NACK) in a wireless communication system, the device configured with a plurality of serving cells and comprising:
   a transceiver configured to transmit and receive a radio signal; and
   a processor operatively coupled to the transceiver and configured to:
   control the transceiver to receive a first resource configuration for a first physical uplink control channel (PUCCH) format;

control the transceiver to receive a second resource configuration for a second PUCCH format;

control the transceiver to receive at least one physical downlink shared channel (PDSCH) from at least one serving cell of the plurality of serving cells;

select one of the first PUCCH format and the second PUCCH format based on a size of an ACK/NACK for the at least one PDSCH; and control the transceiver to transmit the ACK/NACK by using the selected PUCCH format, wherein the first PUCCH format is a PUCCH format 3, and the second PUCCH format has a larger payload size than the first PUCCH format, wherein at least one downlink (DL) grant is received for the at least one PDSCH, the at least one DL grant including an ACK/NACK resource indicator (ARI), and wherein:

if the first PUCCH format is selected, the ARI indicates a PUCCH resource used for the first PUCCH format in the first resource configuration, and if the second PUCCH format is selected, the ARI indicates a PUCCH resource used for the second PUCCH format in the second resource configuration.

8. The device of claim 7, wherein the first PUCCH format comprises 24 data symbols, and the second PUCCH format comprises more than 24 data symbols.

9. The device of claim 8, wherein the first PUCCH format comprises 4 orthogonal frequency division multiplexing (OFDM) symbols for a demodulation reference signal (DMRS) in a subframe, and the second PUCCH format comprises 2 OFDM symbols for the DMRS in the subframe.

10. The device of claim 7, wherein only one resource block is allocated to the first PUCCH format, and the second resource configuration includes information on a number of resource blocks allocated to the second PUCCH format.

11. The device of claim 7, wherein the second PUCCH format is transmitted in a wider bandwidth than the first PUCCH format.

12. The device of claim 7, wherein the plurality of serving cells include a secondary cell, the ACK/NACK being transmitted by using the selected PUCCH format at the secondary cell.

* * * * *